United States Patent
Hirokawa et al.

[15] 3,665,289
[45] May 23, 1972

[54] INVERTER

[72] Inventors: Yoichi Hirokawa, Kamakura; Masatoshi Sato, Tokyo, both of Japan

[73] Assignee: Kabushiki Kaisha Tokyo Keiki (Tokyo Keiki Co., Ltd.), Tokyo, Japan

[22] Filed: Jan. 18, 1971

[21] Appl. No.: 107,109

[30] Foreign Application Priority Data
Jan. 23, 1970 Japan..................................45/7169

[52] U.S. Cl..........................................321/45 R, 321/45 S
[51] Int. Cl. ......................................................H02m 7/48
[58] Field of Search..........................321/11, 16, 18, 45, 45 S; 331/113 S

[56] References Cited
UNITED STATES PATENTS

| | | |
|---|---|---|
| 3,246,227 | 4/1966 | Strohmeier et al...................321/45 X |
| 3,334,291 | 8/1967 | Hehenkamp..........................321/45 S |
| 3,350,625 | 10/1967 | Larsen.................................321/45 S |
| 3,448,368 | 6/1969 | Brouwer ..............................321/45 X |
| 3,412,309 | 11/1968 | Boonstra..............................321/45 X |

Primary Examiner—William M. Shoop, Jr.
Attorney—Hill, Sherman, Meroni, Gross & Simpson

[57] ABSTRACT

A parallel-connected type, self-commutation and self-controlled inverter employing two controlled rectifier elements, in which the connection point of one electrode of one of the controlled rectifier elements with the primary winding of a transformer of the inverter is connected to the gate of the other controlled rectifier element through a pulse generator circuit.

3 Claims, 2 Drawing Figures

Patented May 23, 1972 3,665,289

INVENTORS
Yoichi Hirokawa
Masatoshi Sato

INVERTER

BACKGROUND OF THE INVENTION

1. Field of the Invention

This invention relates to an inverter, especially a self-controlled inverter employing controlled rectifier elements (hereinafter referred to as thyristors) which is of the type that uses frequencies produced by the inverter itself as frequencies for controlling the gates of the thyristors, and more particularly to an inverter which avoid commutation failure at starting when an induction motor or the like is employed as a load.

2. Description of the Prior Art

In a conventional parallel-connected, self-excited and self-controlled inverter two switches usually remain closed when the power source is cut off, so that when the power source is restored to its operative condition while the load is acting as a generator, a pulse is produced by a pulse generator circuit and is applied to the gate of one of the thyristors. At this time, no problem occurs, if the one thyristor is in the on state, but in the event that the power source is restored while the other thyristor is in the one state, the trigger signal is applied to the gate of the one thyristor as above described, so that the both thyristors become conductive at the same time to render the inverter inoperative. Thus, the prior art inverter has a serious defect.

SUMMARY OF THE INVENTION

Accordingly, the primary object of this invention is to provide a novel inverter which is free from the aforementioned defect encountered in the prior art.

DESCRIPTION OF THE PREFERRED EMBODIMENT

Figure 1:
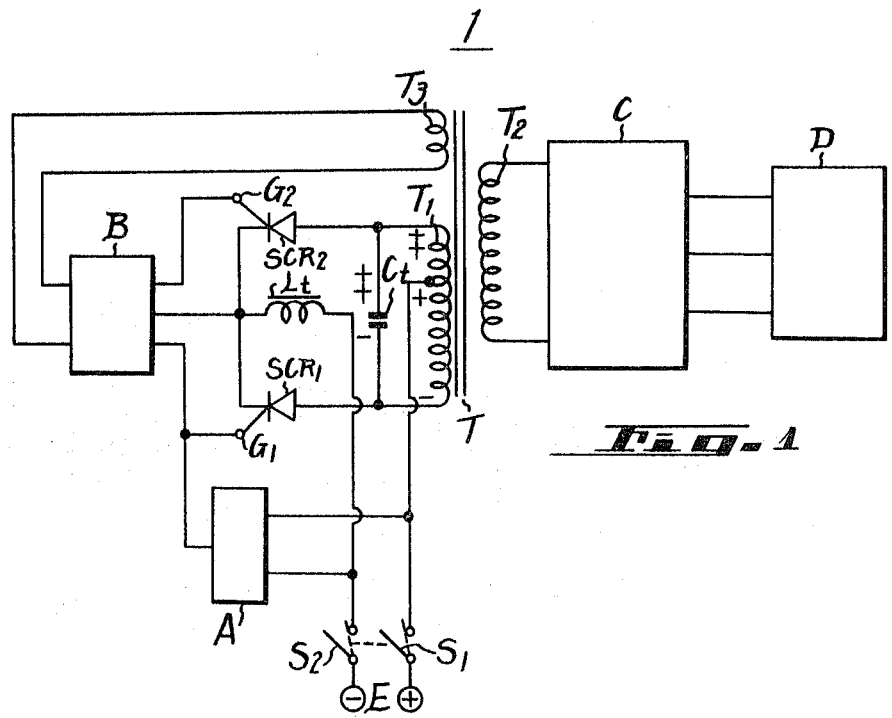
FIG. 1 is a fundamental circuit diagram of a parallel-connected type, self-commutation and self-controlled inverter.

To facilitate a better understanding of this invention, a description will be given first of a conventional parallel-connected type, self-commutation and self-controlled inverter such, for example, as depicted in FIG. 1. In the figure reference numeral 1 indicates generally a prior art parallel-connected type, self-commutation and self-controlled inverter and E an input DC power source for the inverter 1. For example, the positive side ⊕ of the DC power source E is connected through a switch $S_1$ to the mid point of primary winding $T_1$ of an output transformer T and to an input side of a pulse generator circuit A for starting the inverter. While, the negative side ⊖ of the DC power source E is connected through a switch $S_2$ to the other input side of the pulse generator circuit A and to one end of a choke coil Lt. Reference characters $SCR_1$ and $SCR_2$ designate thyristors, which respectively have their anode electrodes connected to opposite ends of the primary winding $T_1$. Their cathodes are connected together and to the other end choke coil Lt. Further, the output side of the pulse generator circuit A for starting the inverter is connected to the gate $G_1$ of the thyristor $SCR_1$. One output side of a gate signal generator circuit B is similarly connected to the gate $G_1$ of the thyristor $SCR_1$. The input sides of the gate signal generator circuit B are connected to opposite ends of a tertiary winding $T_3$ of the transformer T. The remaining output side of the gate signal generator circuit B is connected to the gate $G_2$ of the thyristor $SCR_2$ and the neutral point of the generator circuit B is connected to that end of the choke coil Lt which is connected to the thyristors $SCR_1$ and $SCR_2$. Reference character Ct designates a commutation capacitor interposed between opposite ends of the primary winding $T_1$ of the transformer T. Further, both ends of the secondary winding $T_2$ of the transformer T are connected to the input side of a single-to-three phase converter C, whose output side is, in turn, connected to a load D such, for example, as an induction motor.

The following will describe the operation of the conventional inverter 1 above described. When the ganged switches $S_1$ and $S_2$ as indicated by broken lines in FIG. 1 are closed, the voltage of the DC power source E is impressed on both ends of the thyristors $SCR_1$ and $SCR_2$ and, at the same time, a starting trigger pulse is generated by the pulse generator circuit A and is impressed on the gate $G_1$ of thyristor $SCR_1$ to turn it on. This provides a closed circuit between the DC power source E, the primary winding $T_1$, the thyristor $SCR_1$, the choke coil Lt and the DC power source E and a current flows in this closed circuit. As a result of this, voltages such as indicated by +, ++ and − are induced in the primary winding $T_1$ of the transformer T. Based upon the voltages induced in the primary winding $T_1$ of the transformer T, voltages are respectively induced in the secondary and tertiary windings $T_2$ and $T_3$. The gate signal generator circuit B is driven by the voltage produced in the tertiary winding $T_3$, which causes a signal to be impressed on the gate $G_1$ of the thyristor $SCR_1$ from the generator circuit B. The phase of the gate signal derived from the gate signal generator circuit B is selected such that it is impressed on the gate $G_1$ when the thyristor $SCR_1$ is in the on state. The gate signal generator circuit B is adapted to be inverted in phase at a predetermined cycle, so that after the impression of the gate signal to the gate $G_1$ of the thyristor $SCR_1$ the signal from the generator circuit B is applied to the gate $G_2$ of the thyristor $SCR_2$ to turn it on to form a closed circuit of the DC power source E, the primary winding $T_1$, the thyristor $SCR_2$, the choke coil Lt to the DC power source E and a current flows in this closed circuit. Upon conduction of the thyristor $SCR_2$, the charge stored by the conduction of the thyristor $SCR_1$ in the capacitor Ct as indicated by ++ and − applies a reverse bias through the thyristor $SCR_2$ to the thyristor $SCR_1$ to turn off $SCR_1$. In response to such control of the thyristors $SCR_1$ and $SCR_2$ with the gate signal generator circuit B a voltage is induced in the secondary winding $T_2$ of the transformer T. The voltage induced in the secondary winding $T_2$ is supplied to the load D through the single-to-three phase converter C. In the event that the load D is, for example, an induction motor as above described, when the input power source E is cut off the induction motor serves as an induction generator based upon the resistance, inductance and line capacitance of the induction motor or the capacitance of the single-to-three phase converter. At this time, the output three-phase voltage has a considerably high level and induces voltages in the primary and tertiary windings $T_1$ and $T_3$ of the transformer T, by which the gate signal generator circuit B operates normally to control the thyristors $SCR_1$ and $SCR_2$, thus actuating the inverter 1 as if it is operated normally.

With such an arrangement, the switches $S_1$ and $S_2$ usually remain closed when the power source stops, so that when the power source is restored to its operative condition while the load is serving as a generator, a pulse is produced by the pulse generator A and is applied to the gate $G_1$ of the thyristor $SCR_1$. At this time, no problem occurs, if the thyristor $SCR_1$ is conductive, but in the case where the power source is restored to its operative condition while the thyristor $SCR_2$ is conductive, the trigger signal is fed to the gate $G_1$ of the thyristor $SCR_1$ as above described, so that the both thyristors $SCR_1$ and $SCR_2$ becomes conductive at the same time to render the inverter 1 inoperative. The conventional inverter therefore has a serious defect.

Figure 2:
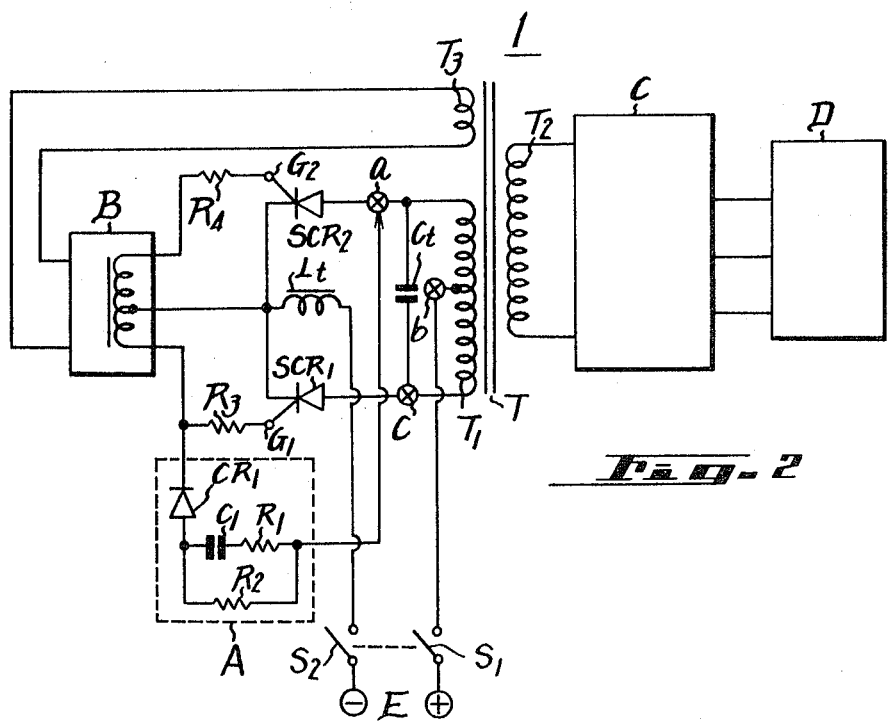
FIG. 2 is a circuit diagram illustrating one example of an inverter of this invention.

Referring now to FIG. 2, one example of an inverter of this invention will hereinbelow be described. In FIG. 2 reference numerals and characters similar to those in FIG. 1 designate elements similar to those in the former figure.

In accordance with the present invention the prior art circuit is modified with gate resistors $R_3$ and $R_4$ respectively interposed between the gates $G_1$ and $G_2$ of the thyristors $SCR_1$ and $SCR_2$ and the gate signal generator circuit B. The generator circuit A for starting the inverter is made up of resistors $R_1$ and $R_2$, a capacitor $C_1$ and a diode $CR_1$ connected as shown in the figure. This generator circuit A produces a pulse at every closing of the switches $S_1$ and $S_2$ and the pulse is applied through the resistor $R_3$ to the gate $G_1$ of the thyristor SCR₁ in the same manner as previously described. In the present invention the power source of the pulse generator A is derived from the connection point $a$ between the connection point of the primary winding $T_1$ of the transformer T and the commutation capacitor Ct and one electrode (anode) of the thyristor SCR₂. Accordingly, in the event that the power source stops during operation and the inverter is driven by inductive generation from the side of the load (thyristors SCR₁ and SCR₂ alternately turn on and off), even if the power source is suddenly restored to its operative condition, the inverter does not ever become inoperative as in the case of the conventional inverter and operates normally for the following reason. When the power source is restored to its on state while the thyristor SCR₂ is held conductive by the inductive voltage from the load, the pulse generator circuit A does not produce any pulse due to the fact that the anode and cathode of the thyristor SCR₂ are equipotential. Accordingly, the thyristor SCR₁ is not made conductive. That is, even if the power source is restored a certain period of time after cut off, both thyristors SCR₁ and SCR₂ are not turned on simultaneously as in the prior art and the inverter operates normally.

Let it be assumed that the power source of the pulse generator circuit A is derived from the end (point) $c$ of the primary winding $T_1$ of the transformer T opposite from the point $a$. When the power source is restored after it has been cut off and the inverter has been driven by the inductive voltage of the load D, the probability that the inverter is made inoperative is 50 percent. This is because of the fact that the time for conduction and nonconduction of the thyristors SCR₁ and SCR₂ by the inductive voltage of the load is equal to the half cycle of the inductive voltage, namely that the probability of the conduction of either of the thyristors SCR₁ or SCR₂ is 50 percent. While, the thyristor SCR₂ is in the on state, the gate $G_1$ of the thyristor SCR₁ is always supplied with a trigger pulse of a voltage twice as high as that of the power source E.

In the case where the power source of the pulse generator circuit A is derived from the mid point $b$ of the primary winding $T_1$ of the transformer T, when the power source is restored after it has been cut off and the inverter is driven by the inductive voltage of the load, the inverter becomes inoperative at the rate of one to several tens of times for the following reason. That is, while the thyristor SCR₂ is in the on state, the gate $G_1$ of the thyristor SCR₁ is held in reverse biased condition and the thyristor SCR₁ is very difficult to turn on even if supplied with a trigger pulse. Further, an accidental increase in the voltage of the power source E and so on causes an increase in the probability that the inverter will become inoperative and the inverter tends to become inoperative at substantially the same rate as in the case where the power source of the pulse generator circuit A is derived from the point $c$.

As has been described in the foregoing, the present invention eliminates the possibility of the inverter becoming inoperative when the main power source or the inverter power source is restored after being temporarily cut off and the inverter of the present invention is simple in construction and hence inexpensive.

It will be apparent that many modifications and variations may be effected without departing from the scope of the novel concepts of this invention.

We claim as our invention:

1. A parallel-connected type, self-commutation, self-controlled inverter comprising:
   a transformer with a primary winding and a pair of secondary windings;
   an inductive load connected to one of said secondary windings;
   a capacitor connected across said primary winding;
   a pair of gated controlled rectifiers with their anodes connected to opposite ends of said primary winding and their cathodes connected together;
   a power supply connected to a tap point on said primary winding and to said cathodes;
   a gate signal generator receiving an input from said second secondary winding and including an output winding with a tap point connected to said cathodes of said controlled rectifiers;
   a first resistor connected between the gate of the first of said pair of gated rectifiers and one end of said output winding, a second resistor connected between the gate of the second of said pair of gated rectifiers and the second end of said output winding; and
   a pulse generator connected between the second end of said output winding and the anode of said first gated rectifiers.

2. An inverter according to claim 1 wherein said pulse generator comprises a diode with its cathode connected to the second end of said output winding, a second capacitor connected to the anode of said diode, a third resistor connected between the anode of said first gated rectifier and the other side of said second capacitor, and a fourth capacitor connected in parallel with the series connected diode and said third resistor.

3. A parallel-connected type, self-commutation, self-controlled inverter employing two controlled rectifier elements, in which the connection point of one electrode of one of the controlled rectifier elements with the primary winding of a transformer of the inverter is connected to the gate of the other controlled rectifier element through a pulse generator circuit for preventing occurrence of mis-commutation of said controlled rectifier elements upon starting of said inverter.

* * * * *